(12) United States Patent
Migdal

(10) Patent No.: US 6,426,753 B1
(45) Date of Patent: Jul. 30, 2002

(54) CACHE MEMORY FOR HIGH LATENCY AND OUT-OF-ORDER RETURN OF TEXTURE DATA

(75) Inventor: Christopher Migdal, Mountain View, CA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/345,366

(22) Filed: Jul. 1, 1999

(51) Int. Cl.[7] .................................................. G06T 1/20
(52) U.S. Cl. ....................... 345/506; 345/552; 345/582; 345/557
(58) Field of Search ................................ 345/506, 501, 345/502, 505, 530, 545, 552, 557, 582

(56) References Cited

U.S. PATENT DOCUMENTS

| | | | | |
|---|---|---|---|---|
| 5,841,444 A | * | 11/1998 | Mun et al. | 345/505 |
| 5,886,701 A | * | 3/1999 | Chauvin et al. | 345/418 |
| 6,057,847 A | * | 5/2000 | Jenkins | 345/422 |
| 6,104,418 A | * | 8/2000 | Tanaka et al. | 345/531 |
| 6,111,585 A | * | 8/2000 | Choi | 345/552 |
| 6,292,200 B1 | * | 9/2001 | Bowen et al. | 345/506 |

* cited by examiner

*Primary Examiner*—Kee M. Tung
(74) *Attorney, Agent, or Firm*—Woodcock Washburn LLP

(57) ABSTRACT

A cache memory for high latency and out-of-order return of texture data. The present invention includes a texture cache memory that prefetches texture data before it is needed. Further, the texture cache memory counts the number of times a cache line is requested and a number of times the cache line is read, and determines whether the cache line is free by keeping track of the different between the two numbers. The texture cache memory of the present invention is capable of working efficiently in computer systems where there is a long latency from the time the texture data is requested and the time the texture data is available for use. In addition, the present invention is capable of handling texture data which enters into the texture cache memory in a different order from which it was requested. The present invention significantly improves performance of the texture data retrieval subsystem within network based or memory hierarchy based computer systems.

21 Claims, 11 Drawing Sheets

CACHE MEMORY FOR HIGH LATENCY AND OUT-OF-ORDER RETURN OF TEXTURE DATA

RELATED CASES

The instant application is a continuation-in-part of co-pending United States Patent Application Serial Number (TBD), filed on (TBD), and entitled "A Computer System Having A Distributed Texture Memory Architecture," by Christopher Migdal et al. and assigned to the assignee of the present invention.

FIELD OF THE INVENTION

The present invention relates to a scaleable network based computer system having a distributed texture memory architecture.

BACKGROUND OF THE INVENTION

Today, computers are used in many different applications. One application suited for computers is that of generating three-dimensional graphics. Computer-generated 3-D graphics is used in business, science, animation, simulation, computer-aided design, process control, electronic publication, etc. In an effort to portray a more realistic real-world representation, three dimensional objects are transformed into models having the illusion of depth for display onto a two-dimensional computer screen. This is accomplished by using a number of polygons to represent a three-dimensional object. Complex three-dimensional objects may require upwards of hundreds or thousands of polygons in order to form an accurate model. Hence, a three-dimensional object can be readily manipulated (e.g., displayed in a different location, rotated, scaled, etc.) by processing the individual respective polygons corresponding to that object. Next, a scan conversion process is used to determine which pixels of a computer display fall within each of the specified polygons. Thereupon, texture is applied to only those pixels residing within specified polygons. In addition, hidden or obscured surfaces, which are normally not visible, are eliminated from view. Hence, displaying a three-dimensional object on a computer system is a rather complicated task and can require a tremendous amount of processing power.

This is especially true for those cases involving dynamic computer graphics for displaying three-dimensional objects that are in motion. In order to simulate smooth motion, the computer system should have a frame rate of at least 30 hertz. In other words, new images should be updated, redrawn and displayed at least thirty times a second. This imposes a heavy processing and computational burden on the computer system. Indeed, even more processing power is required for interactive computer graphics, where displayed images change in response to a user input and where there are multiple objects in a richly detailed scene. Each additional object that is added into a scene, needs to be modeled, scan converted, textured, Z-buffered for depth, etc., all of which, adds to the amount of processing resources that is required. In addition, it would be highly preferable if lighting, shadowing, shading, and fog could be included as part of the 3-D scene. Generating these special effects, again, consumes valuable processing resources. Moreover, the "richer" and more realistic a scene becomes, the more processing power that is required to render that scene. Even though the processing power of computer systems continues to improve, there is a demand for even faster, cheaper, and more powerful computer systems.

"Pipelining" is a common approach used for improving the overall performance of a computer system. In a pipelined architecture, a series of interconnected stages are used to render an image. Each stage performs a unique task during each clock cycle. For example, one stage might be used to scan-convert a pixel; a subsequent stage may be used for color conversion; another stage could be used to perform depth comparisons; this is followed by a texture stage for texturing; etc. In practice, it would take several pipeline stages to implement one of the previous exemplary blocks. The advantage of using a pipelined architecture is that as soon as one stage has completed its task on a pixel, that stage can immediately proceed to work on the next pixel. It does not have to wait for the processing of a prior pixel to complete before it can begin processing the current pixel. Thereby, pixels can flow through the pipeline at a rapid rate. By analogy, a pipelined architecture is similar to a fire brigade whereby a bucket is passed from one person to another down the line.

There are limits to how many pipeline stages a task may be broken down to increase its performance. Eventually a point is reached when the adding of additional pipeline stages to a task no longer increases performance due to the overhead associated with pipelining. In order to increase performance over a single pipeline, several pipelines can be connected together in a parallel. This technique is referred to parallel-pipelined approach.

There are, however, several disadvantages with using a parallel pipelined approach. One drawback to using a parallel pipelined architecture is that because each of the pipelines operate independently from the other pipelines, each pipeline must have access to its own set of texture data. This is especially the case when several pipelines perform parallel processing together in order to generate a single frame's worth of data. As a result, duplicate copies of texture data must be maintained. In other words, the same set of texture data must be replicated for each of the different pipelines. Furthermore, some computer vendors offer the option of adding extra plug-in cards to increase a computer's performance. Again, these cards operate independently of each other. And because they cannot communicate amongst themselves, each card must have its own dedicated memory. Rather than sharing data between cards, entire data sets are duplicated per each individual card.

This duplication is expensive in terms of the amount of memory chips which are required to store the duplicate information. Many applications today require extremely large texture maps. Although prices for memory chips have been falling, storing the entire texture map in dynamic random access memory chips is prohibitively expensive, especially if numerous duplicate copies of the texture map must be maintained. Moreover, textures exhibiting higher resolutions consume that much more memory. In addition, the same texture map is often stored at different levels of details. Due to the extremely large memory requirements, computer manufacturers have taken to storing entire texture maps on disk. Pieces of the texture map are then loaded into memory chips on an as needed basis. However, disk I/O operations are extremely slow. Thereby, computer designers face a dilemma: either limit the amount of texture data which can be stored and suffer visually inferior graphics or store texture data on disk and suffer much slower graphics display.

The aforementioned problems can be solved by storing the texture data within a distributed texture memory that is accessible by any and all rasterization circuits. Because the texture data can be shared by multiple rasterization circuits, only a single copy of the texture memory need be maintained within the computer system.

However, one problem associated with such a distributed memory architecture is that distributed texture memories are not easily cacheable. A typical cache matches requests against its contents and faults when the desired piece of data is not there. It then requests this data (or typically a block of data containing the desired data). The cache is stalled until the data is available. In a system with a distributed texture memory architecture, stalling is unacceptable since a stall would last on the order of 100 clocks. Therefore, what is needed is a cache memory that can avoid the majority of stalling on cache misses.

Another problem is that typical caches expect requested data to return in the order requested. This restriction, however, is not possible in a system with a distributed texture memory architecture because texture data may return in a different order from which they are requested. Therefore, what is also needed is a cache memory that can handle out-of-order return of texture data.

SUMMARY OF THE DISCLOSURE

Accordingly, the present invention provides a cache memory for high latency and out-of-order return of texture data. The present invention includes a texture cache memory that is capable of working efficiently in computer systems where there is a long latency from the time the texture data is requested and the time the texture data is available for use. In addition, the present invention is capable of handling texture responses which enter into the texture cache memory in a different order from which they were requested. The present invention significantly improves performance of a computer system having a distributed texture memory architecture.

In the currently preferred embodiment, the present invention is practiced within a computer system having an internal transmission network which is used to transmit packets between a host processor and a number of subsystems. Three basic types of subsystems are coupled to the network: a geometry subsystem is used to process primitives; a rasterization subsystem is used to render pixels; and a display subsystem is used to drive a computer monitor. Texture and/or frame buffer data is stored in memory chips associated with the rasterization subsystems. A rasterization subsystem can access texture data from its associated memory chips or can request texture data residing within any of the other memory chips. A texture request is sent over the internal network; the requested texture data is packetized and then sent over the internal network to the requesting rasterization subsystem.

Significantly, in the currently preferred embodiment, the rasterization subsystem includes a texture cache memory that caches the distributed texture data. The rasterization subsystem conceals, or minimizes, latency in the transmission network by prefetching the distributed texture data and storing the prefetched texture data within the texture cache memory. The rasterization subsystem further includes a cache address queue that stores cache addresses according to the order in which the texture requests are sent. A texture filter of the rasterization subsystem is coupled to the address queue to receive the cache addresses. The texture filter, upon receiving the cache addresses, retrieves the prefetched texture data from the texture cache memory. In this way, the prefetched texture data can be retrieved independently of the order in which the texture data enters the texture cache memory.

Embodiments of the present invention include the above and further include a method of rendering pixels with texture data stored in distributed texture memories. The method includes the steps of: receiving texture memory addresses that correspond to cache addresses of a texture cache memory; sending texture requests for addresses not currently in the cache to the distributed texture memories; receiving texture responses from the distributed texture memories and storing the texture responses within the texture cache memory; and retrieving the texture responses from the texture cache memory according to the order in which the texture addresses are sent and independent of the order in which the texture responses enter the texture cache memory.

BRIEF DESCRIPTION OF THE DRAWINGS

The operation of this invention can be best visualized by reference to the drawings.

DETAILED DESCRIPTION OF THE PREFERRED EMBODIMENTS

In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Figure 1:
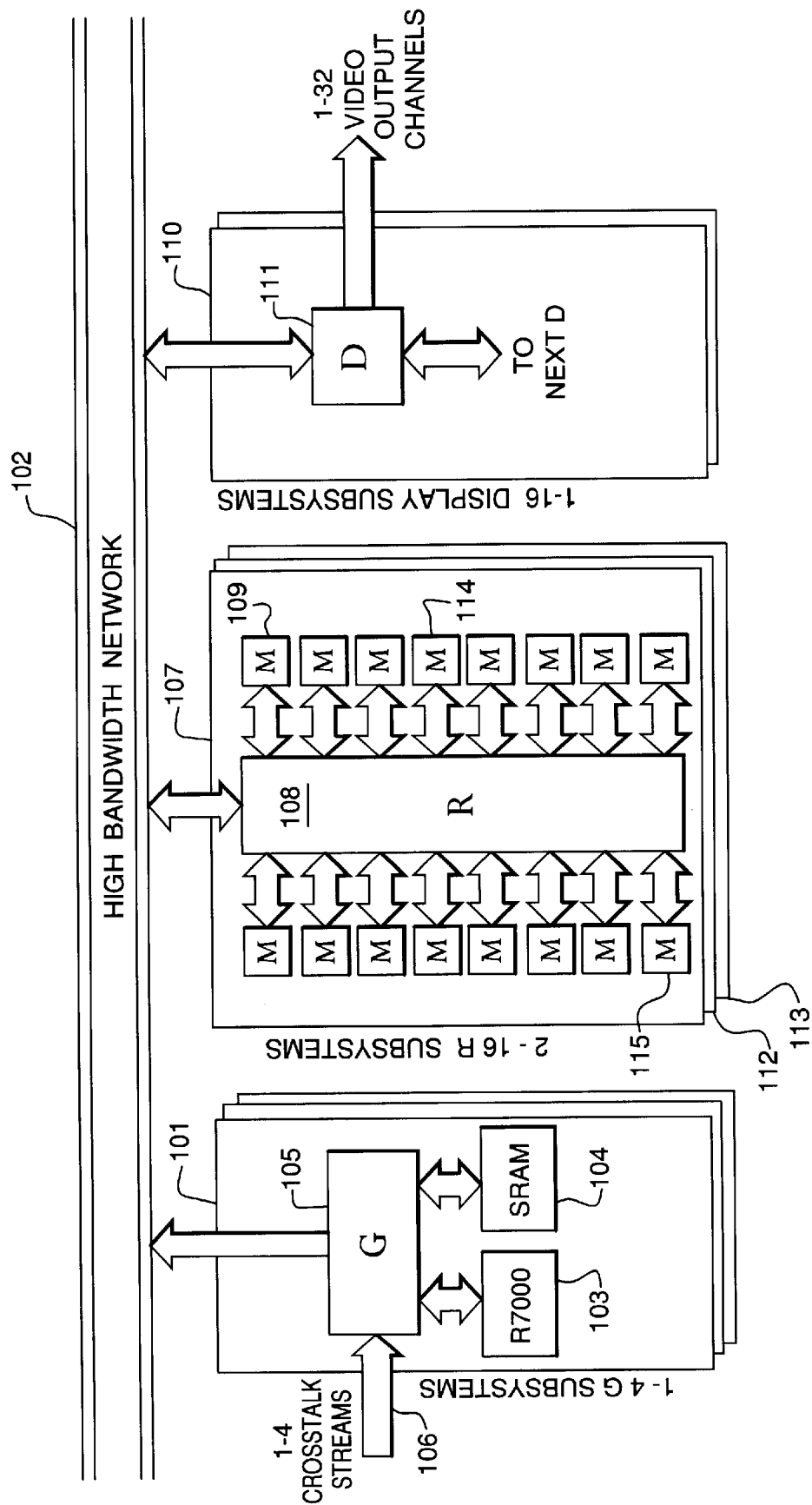
FIG. 1 shows a block diagram of the currently preferred embodiment of the network based computer system according to the present invention.

I. Distributed Texture Memory Architecture in Accordance with the Present Invention Referring now to FIG. 1, a block diagram of a network based computer system upon which the present invention may be practiced is shown. The network based computer system consists of a very high bandwidth point-to-point network based on a fully-connected topology, onto which a number of nodes are attached. Many different types of networks and protocols can be physically implemented. For example, an Ethernet based network can be used. Alternatively, a network as described in the patent application entitled, "Apparatus and Method For Utilizing Multiple Rendering Pipes For A Single 3-D Display," Ser. No. 09/177,911, assigned to the present assignee, filed on Oct. 23, 1998, and which is incorporated in its entirety herein, can be used in the present invention. Four node types are contemplated: a geometry (G) subsystem, a rasterizer (R) subsystem, a display (D) subsystem, and a network (N) subsystem. One to four G subsystems 101 can be coupled to a high bandwidth network 102. The G subsystems comprise a multiprocessor 103 (e.g., the R7000 RISC microprocessor manufactured by MIPS Technologies), some static random access memory (SRAM) 104, and a geometry ASIC chip 105. The G chip 105 accepts instructions and data from Crosstalk streams 106. The instructions are executed by microprocessor 103 and G chip 105. G chip 105 also performs geometric calculations on vertex data. Data is temporarily cached in SRAM 104. Eventually, the resulting vertex data is sent over the high bandwidth network 102 to one of the R subsystems.

In the currently preferred embodiment, two to sixteen R subsystems 107 are used to perform pixel rasterization functions. R subsystems basically are comprised of a rasterization ASIC (R) chip 108 and multiple memory (M) chips 109. The actual rasterization functions are performed by R chip 108, whereas framebuffer and texture memory is provided by the M chips.

The resulting pixel data is then sent over the high bandwidth network 102 to one of the display subsystems 110. One to sixteen display subsystems 110, comprised of a display ASIC chip 111, is used to drive one to thirty-two video output channels. One D chip can also be coupled to another D chip.

The network based computer system can be scaled by adding or removing G, R, and D subsystems as required. Theoretically, any number of G, R, and D subsystems can be implemented to form one integrated computer system. In its most basic configuration, the network computer must have at least one G subsystem, at least one R subsystem with at least one M memory, and at least one D subsystem. The user may improve the performance of the network computer system by adding the appropriate subsystem. For example, if more texture or framebuffer memory is needed, the user simply adds more R chips with their associated M chips. Likewise, if geometric calculations are performed too slowly, one or more G subsystems can be added. One or more G subsystems can work to process primitives for a single frame's worth of display. For example, while a first G subsystem is processing primitives for one section of a frame, other G subsystem(s) can simultaneously be processing primitives for other section(s) of the frame. Moreover, pixels can be rendered faster by simply inserting additional R subsystems; and more displays can be driven by adding D subsystems.

Each of the G, R, and D subsystems can communicate with any other G, R, and D subsystem coupled to the high bandwidth network 102. Packets of data can be transmitted from any one of the subsystems to any other of the subsystems over the high bandwidth network 102. This allows portions of data to be stored in any of the M chips and still be accessible to any of the G, R, and D chips. Because data is accessible over the internal network, this eliminates the need to store duplicate copies of data. For example, suppose that portions of a texture map are stored in M chips 114 and 115 of R subsystem 107. Another R chip residing within R subsystem 112 can access these two portions by issuing a request with the appropriate address. The request is routed over the internal network 102 and received by R subsystem 107. R subsystem 107 examines the address and recognizes that it has the responsibility of servicing that request. The requested data is then read from the two M chips 114 and 115. The data is packetized and sent over the internal network 102 to the requesting R subsystem 112. Likewise, the R chip of R subsystem 113 could access the same texture map data stored in M chips 114 and 115. Similarly, portions of texture and/or frame buffer data can be stored in the M chips belonging to different R subsystems and are, nevertheless, accessible to the other subsystems (G, R, or D) via the high bandwidth internal network 102. The goal then is to distribute the texture data evenly so as to minimize the possibility of having data request bottlenecks whereby the same piece of memory is accessed by multiple sources. The interfaces between the network and the G, R, and D subsystems are handled by one or more network (N) subsystems and high-speed buses. Increasing the number of subsystems also might entail adding N subsystems and additional buses.

The network supports several configurations, referred to as 16R (24 node), 8R (12 node), and 4R (6 node) and 2R configurations. A network based computer system has two complete networks in each configuration. A 16R network consists of 8 N chips, four in each network. In such a configuration, an N chip has four R ports, six Network ports, and two additional ports that connect to either a G chip or a string of up to 4 D chips. One of the G chips is designated as being the "primary" G chip corresponding to an N chip configuration. Each N chip contains two routing tables that need to be programmed before normal network activity is allowed to occur. This is accomplished by the primary G chip. It can be done via predefined tables or tables constructed through a network discovery process. The process is for the master G to probe the configuration register that each network connectable chip has at network address 0. After the entire network is searched, the correct tables can be constructed and written into each N chip. It should be noted that if multiple networks exist that are in different N chips (e.g., the 16R configuration), the primary G chip will have to program both networks separately.

Figure 2:
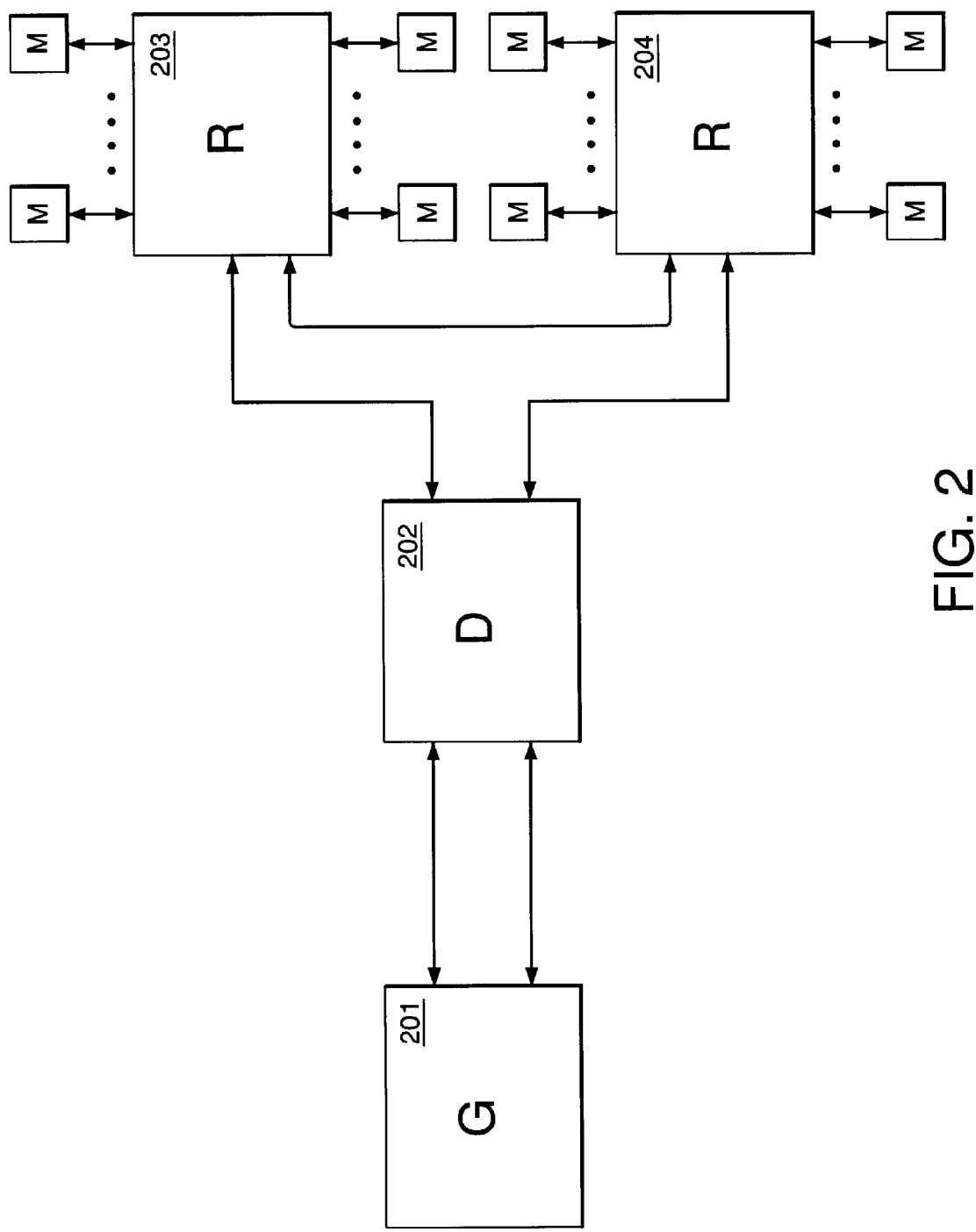
FIG. 2 shows a 2-R embodiment, whereby a G chip is coupled to a D chip, which in turn, is coupled to two R chips.

FIG. 2 shows a 2-R embodiment, whereby a G chip 201 is coupled to a D chip 202, which in turn, is coupled to two R chips 203 and 204. Each of the two R chips 203 and 204 can be coupled to a number of M chips for storing texture and/or framebuffer data. Although the 2R configuration can be implemented as a depopulation, this 2R configuration does not require any N chips, and is therefore less expensive to build. In summary, the network based computer system consists of one or more host processors, G, R, M, N, and D subsystems/chips. The computer system can be readily scaled up by adding more of the appropriate types of chips. Also, by limiting the number of parts to just five basic types, the parts count and inventory is kept to a minimum. Yet, these types of chips form the foundations for implementing a wide variety of different configurations. Data generated and/or stored within any of these subsystems can be requested and routed to any of the other subsystems and chips over an internal network. In this manner, a single copy of a texture map can be stored in multiple M chips, but is accessible by any of the other chips. The other chips may simply request the relevant portions. The requested texture data is then packetized and transmitted over the internal network to the requesting subsystem/chip. This eliminates the need to store duplicate copies of texture maps.

Furthermore, communications between the chips allows for greater flexibility in the manner by which processing is performed.

Figure 3:
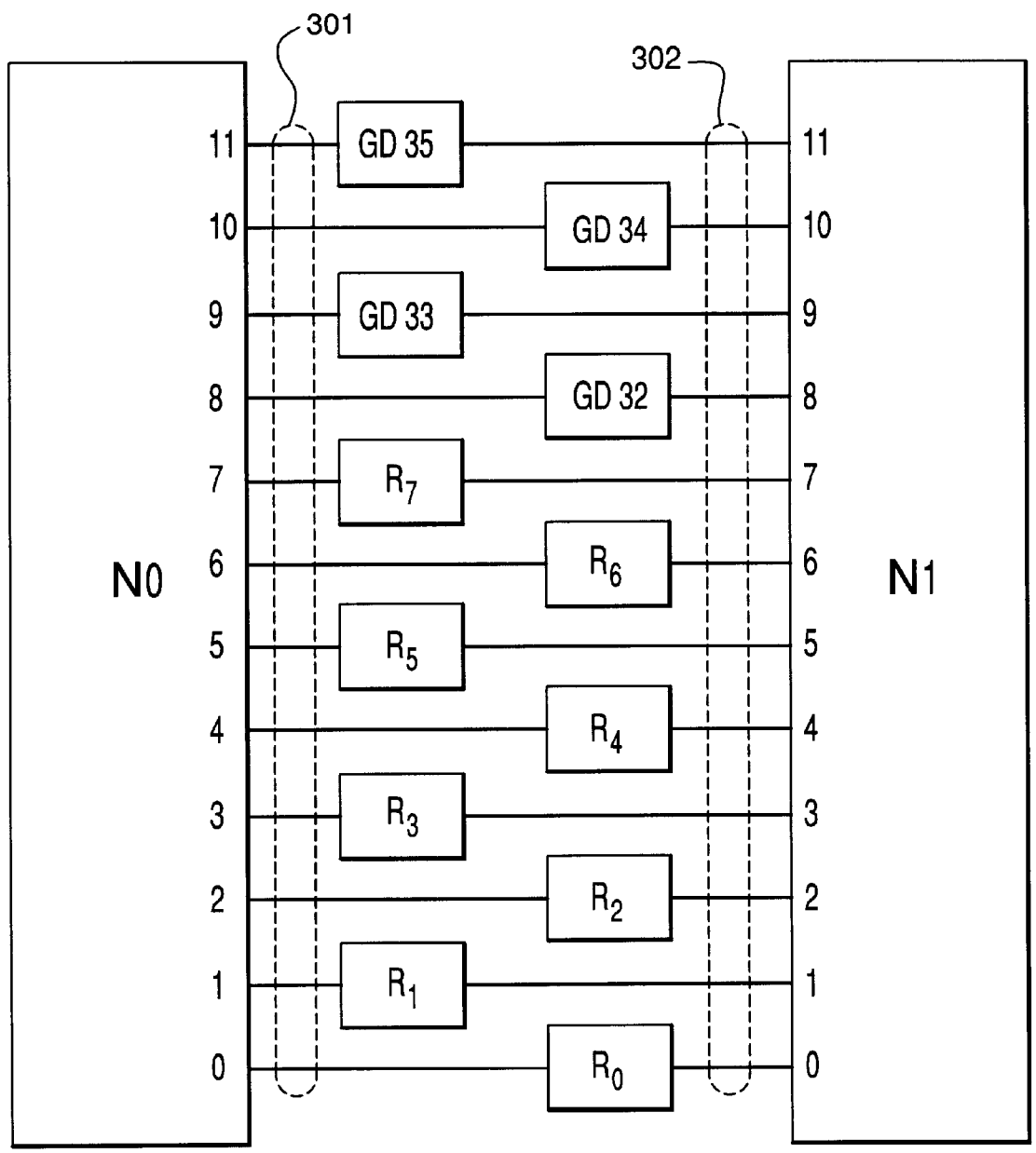
FIG. 3 shows an 8R configuration supporting 12 nodes.

FIG. 3 shows an 8R configuration supporting 12 nodes. Eight of the twelve nodes are used to support up to eight R chips (e.g., R0–R7). Sixteen M chips can be coupled to each of the eight R0–R7 chips. The R0 chip is connected to port 0 of the N0 chip and to port 0 of the N1 chip; the R1 chip is connected to port 1 of the N0 chip and to port 1 of the N1 chip; the R2 chip is connected to port 2 of the N0 chip and to port 2 of the N1 chip; etc. The remaining four nodes can be connected to either G or D chips (e.g., GD32–GD35). In this 8R configuration, there are two networks. Network 0 is comprised of the N0 chip and paths 301; Network 1 is comprised of the N1 chip and paths 302. In one embodiment, each network fits entirely in a single N chip. Thereby, texture data stored in any of the memory chips is accessible to any and all of the R0–R7 chips via the paths 301–302 and N0–N1 chips.

Figure 4:
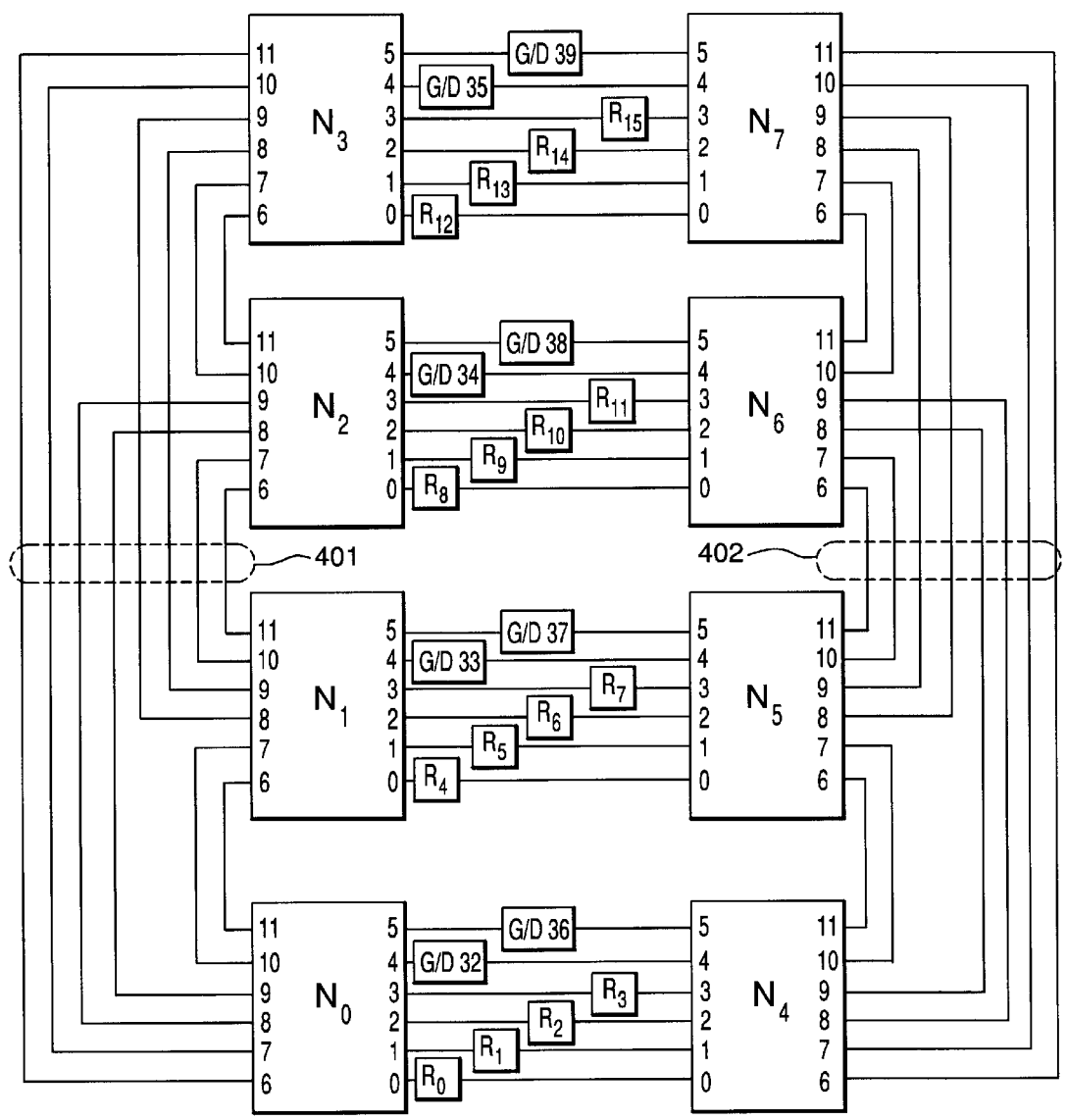
FIG. 4 shows a 16R configuration supporting 24 nodes.

FIG. 4 shows a 16R configuration which supports 24 nodes. In this 24 node configuration, there are eight N chips (N0–N7). These eight N chips support 16R chips (R0–R15). Each of these 16R chips has its own number of M chips (not shown). The R0 chip is connected to port 0 of the N0 chip and to port 0 of the N4 chip; the R1 chip is connected to port 1 of the N0 chip and to port 1 of the N4 chip; the R2 chip is connected to port 2 of the N0 chip and to port 2 of the N4 chip; and the R3 chip is connected to port 3 of the N0 chip and to port 3 of the N4 chip. Likewise, the R4–R7 chips are respectively connected to ports 0–3 of the N1 chip and to ports 0–3 of the N5 chip; the R8–R11 chips are respectively connected to ports 0–3 of the N2 chip and to ports 0–3 of the N6 chip; and the R12–R15 chips are respectively connected to ports 0–3 of the N3 chip and to ports 0–3 of the N7 chip. These same eight N chips also support up to eight G or D chips. For instance the G/D 32 chip connected to port 4 of the N1 chip and also connected to port 4 of the N4 chip, can either be a G chip or a D chip. Likewise, the G/D 36 chip connected to port 5 of the N1 chip and also connected to port 5 of the N4 chip, can either be a G chip or a D chip. In the case of the 16R configuration, each N-to-N chip path has two statically allocated paths or "networks" (e.g., paths 401 and paths 402). Two networks are used to provide more overall bandwidth to the system. Texture data stored in any of the memory chips is accessible to any and all of the 16 R0–R15 chips via the paths 401–402 and N0–N7 chips.

Figure 5:
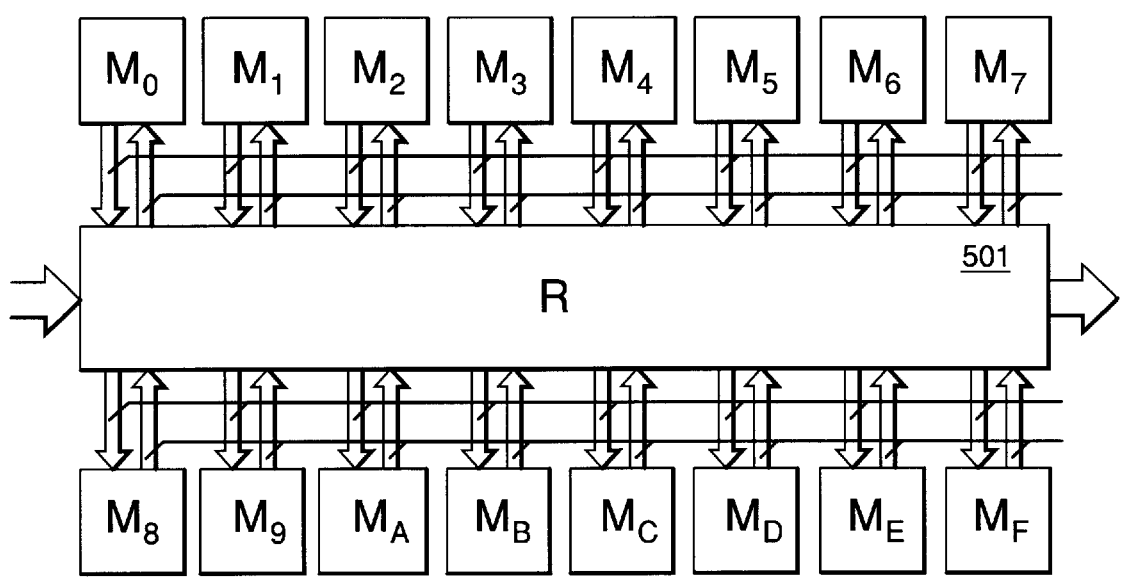
FIG. 5 shows a block diagram of the rasterization subsystem.

FIG. 5 shows a block diagram of the rasterizer subsystem. The R subsystem is comprised of an R chip 501 coupled to sixteen M chips (e.g., M0–MF). The R subsystem performs two main functions: (1) rendering incoming geometric and pixel primitives into specified 16x16 screen patches and (2) servicing requests for texture or frame buffer memory. The main functional part of the rasterizer subsystem is the R chip 501. As stated above, the R chip 501 accepts geometric and pixel primitives from the network and renders each one into a specified 16x16 screen patch. The R chip 501 also handles requests from other R chips for texture data and requests from the display subsystem for frame buffer data. Attached to this are sixteen M (multisample) memory chips, which are used to store the frame buffer screen patches corresponding to the subsystem. A fixed portion of the M memory (typically 3 megabytes per R), is used as a G-to-R FIFO. Any remaining memory is allocated to texture storage and is shared among all rasterizer subsystems. In addition to providing the unified memory for the rasterizer subsystem, the hybrid DRAM/ASIC technology of the M chips supplies enough memory bandwidth to support multisample capability. In the currently preferred embodiment of the present invention, each M chip has 32M bits of on-chip storage. The M chips use ASIC-on-DRAM technology and implements OpenGL Per-Fragment operations, framebuffer, texture memory, and G FIFO memory.

Figure 6:
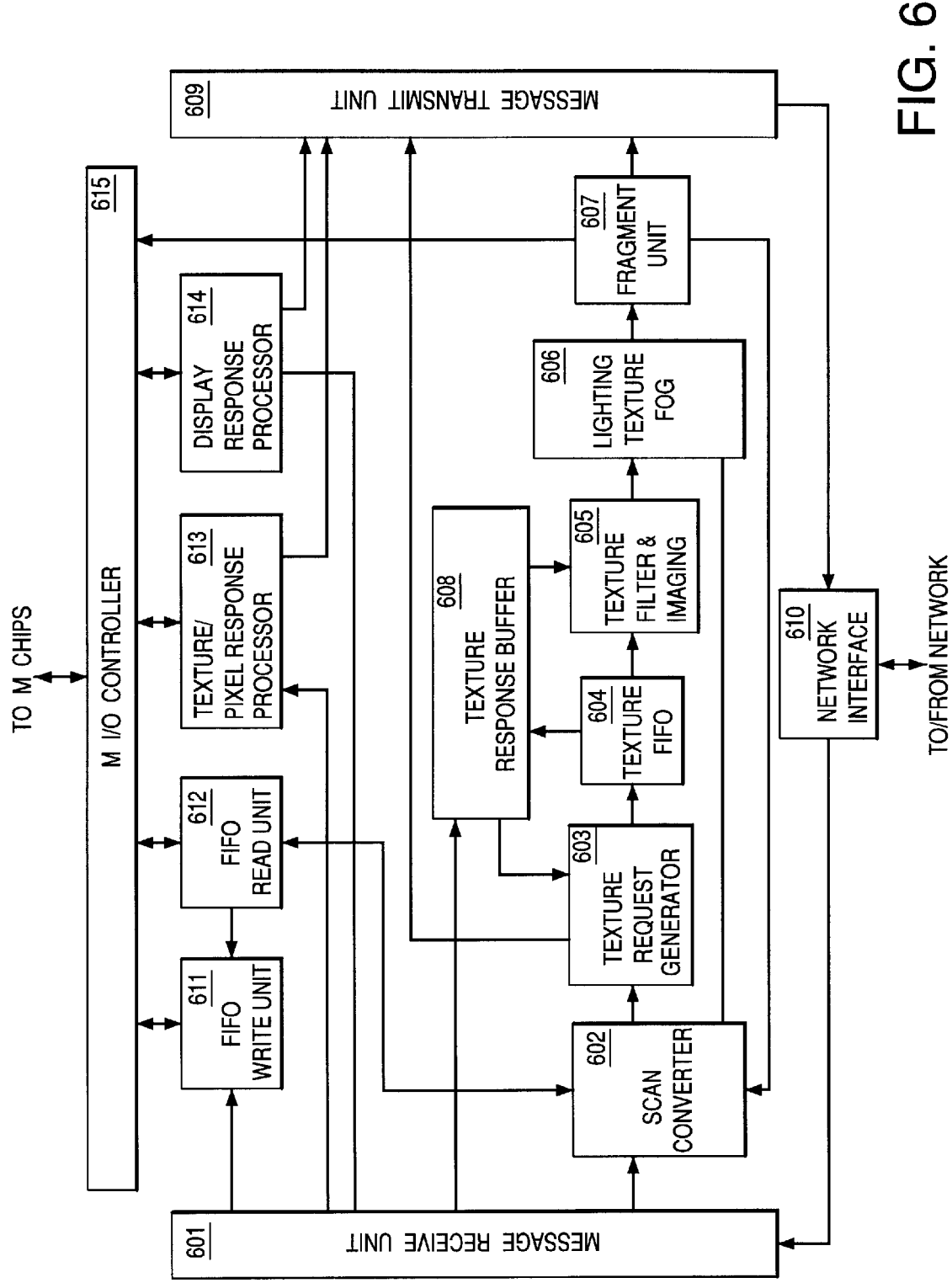
FIG. 6 is a schematic diagram of a rasterization chip in accordance with one embodiment of the present invention.

FIG. 6 is a schematic diagram of an exemplary R chip. The R chip accepts draw stream commands from one to four G chips. It processes points, lines, triangle strips, triangle fans, writing and reading of rectangular arrays of pixels and texels, and local pixel copies. A network is used to support two, four, eight, or sixteen R chips. Each R chip manages framebuffer and texture memory in units of 16×16 pixels or texels. Input to the R chip arrives on the network interface 610. This includes draw commands and pixel read requests from the G chips, texel requests and responses from other R chips, and display pixel requests from the D subsystems. Output from the R chip occurs on the network interface 610. Outputs include read pixel responses, statistics output and FIFO throttle control to the G subsystems, texel requests and responses to other R chips and display pixel responses to the D subsystems.

The R chip is comprised of the message receive unit 601; scan converter 602; texture request generator 603; texture FIFO 604; texture filter and imaging unit 605; lighting, texture, and fog unit 606; fragment unit 607; texture response buffer 608; message transmit unit 609; network interface 610; FIFO write unit 611; FIFO read unit 612; texture/pixel response processor 613; display response processor 614; and M input/output (I/O) controller 615. The message receive unit 601 accepts packets from the input network interface 610 and delivers them to the appropriate block within the R chip. The scan converter 602 scan converts and z-rejects primitive packets and also generates texture coordinates for the texture request generator 603. The texture request generator 603 receives one, two, or three texture coordinates for a pixel and generates the required tile addresses for tiles that need to be loaded into the texture response buffer 608 in order to process the pixel. The texture FIFO 604 stores data needed by the texture response buffer 608 and the texture filter and imaging unit 605 in order to filter texture. The data includes cache addresses, tile addresses, and filter coefficients. The texture FIFO 604 is sized to handle the latency of a texture request/response. Texture filter and imaging unit 605 performs the necessary filtering for texture mapping and image processing including convolution and texture look-up table support. A lighting, texture, and fog unit 606 accepts pixels from the scan converter 602 and filtered texture from the texture filter and imaging unit 605 and performs per-pixel lighting, texture environment, and fog computation. Fragments from the lighting, texture, and fog unit 606 are input to fragment unit 607 which redistributes the fragments to the M chips for processing. It also handles all the buffering of fragment, download, and register packets to the M chips. Furthermore, fragment unit 607 handles sync packets and processes coarse Z culling data returning from the M chips. The fragment unit 607 also incorporates the coarse Z buffer. Texture response buffer 608 primarily acts as a cache for texture requests and deals with the long latency from the time a texture tile is requested until it arrives back from the network. It also contains texture format promotion and decompression hardware.

Further descriptions of the distributed texture memory architecture can be found within United States Patent Application Serial Number (TBD), filed on (TBD), and entitled "A Computer System Having A Distributed Texture Memory Architecture," by Christopher Migdal et al., which is hereby incorporated by reference.

Figure 7:
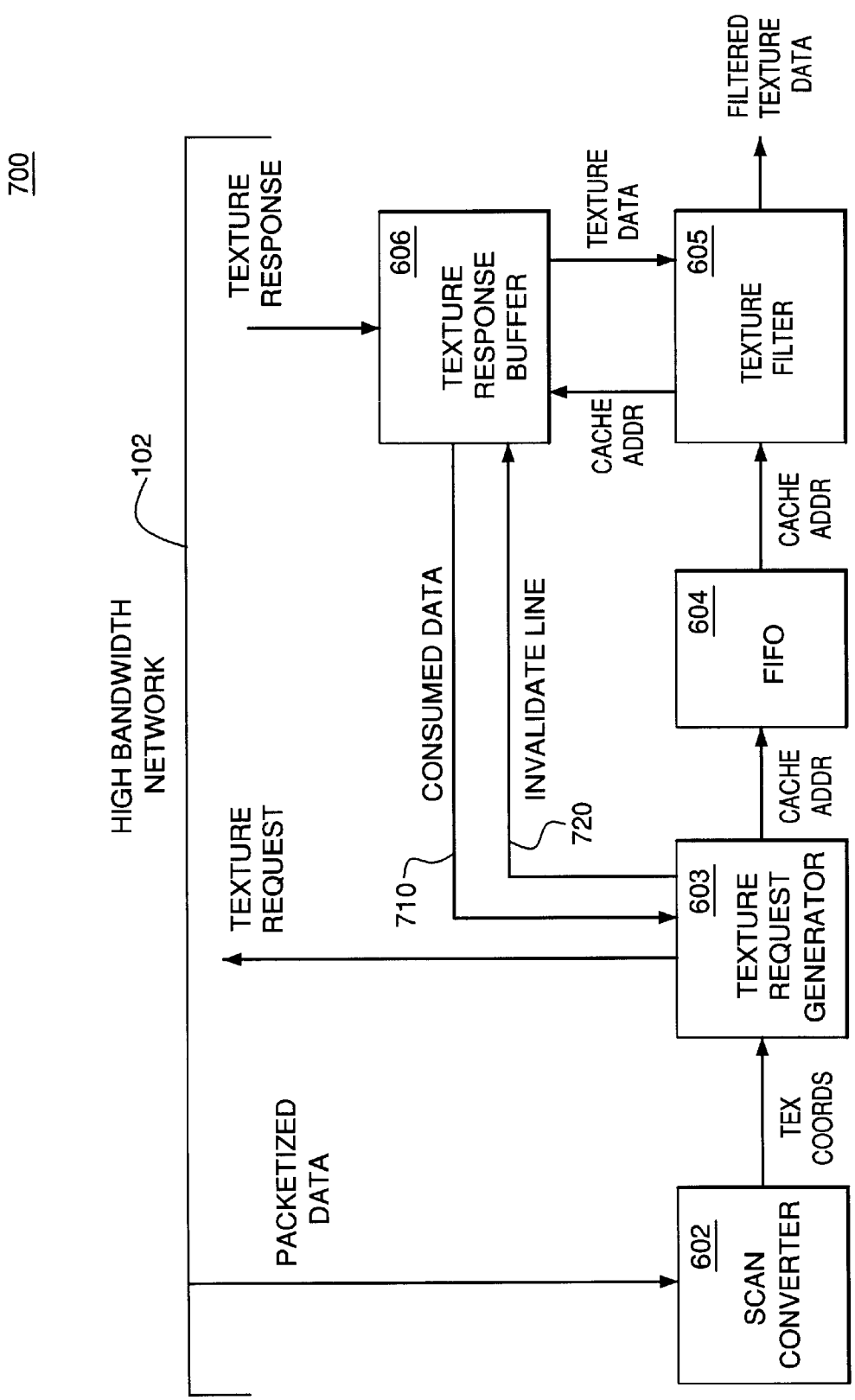
FIG. 7 is a logical block diagram showing a texture cache subsystem of the exemplary R chip of FIG. 6 according to an embodiment of the present invention.

II. Texture Cache for Handling High Latency and Out of Order Texture Data According to the Present Invention FIG. 7 is a logical block diagram showing a texture cache subsystem 700 of the exemplary R chip of FIG. 6 according to an embodiment of the present invention. For simplicity, only scan converter 602, texture request generator 603, FIFO memory 604, texture filter 605, texture response buffer 608 and high bandwidth network 102 are illustrated in FIG. 7.

Although the bandwidth of network 102 is high, it may from time to time experience lags caused by, inter alia, uneven load distribution among the various R chips and M chips. Sometimes, the transmission latency can cause the rasterization process to stall for hundreds of clock cycles. The present invention conceals, or minimizes, this transmission latency problem by temporally separating the request generation process and the texture filtering process. That is, texture data is "prefetched" and stored within the texture response buffer 608 before it is needed.

In accordance with one embodiment of the present invention, scan converter 602 receives primitive packets from network 102, performs scan conversion, and generates texture coordinates for the texture request generator 603. The texture request generator 603 receives one, two, or three texture coordinates for a pixel (corresponding to 1D, 2D, or 3D texture) and generates texture requests for texture data that needs to be loaded into the texture response buffer 608 in order to process the pixel. Texture request generator 603 also maps the texture coordinates to a cache address and sends the cache address to FIFO memory 604, which acts as a queue for cache addresses. Cache addresses received by FIFO memory 604 will reach texture filter 605 after multiple clock cycles. Texture filter 605, upon receiving the cache addresses, will retrieve the texture responses from the texture response buffer 608.

Due to transmission delay and/or uneven load balancing, texture responses may enter the texture response buffer 608 in an order that is different from the order in which the corresponding texture requests are sent. For example, texture request generator 603 may generate a texture request for texture data A and then a texture request for texture data B. Texture data B may be returned by network 102 earlier than texture data A. Thus, the texture filter 605 must be able to handle the out-of-order return of texture data and apply the correct texture data to the pixels. According to the present embodiment, cache addresses are stored in FIFO memory 604 in a first-in-first-out manner as texture requests are sent to network 102. Thus, texture filter 605 will receive cache addresses in the order in which the cache addresses are stored. In this way, texture filtering can be performed in the order in which the cache addresses are requested. Texture filtering thus performed is also independent of the order in which the texture responses are stored.

Figure 12:
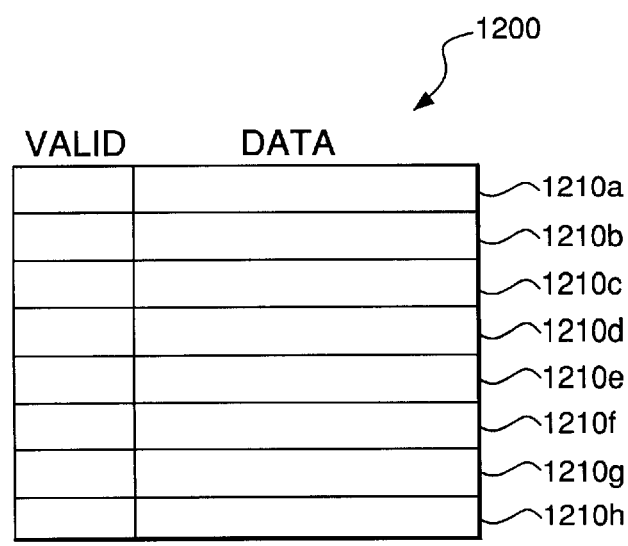
FIG. 12 is a diagram of a cache memory in accordance with an embodiment of the present invention.

FIG. 12 is a diagram of a cache memory 1200 within texture response buffer 608 according to an embodiment of the present invention. As illustrated, cache memory 1200 includes a plurality of cache lines 1210a–1210h for storing texture data. Each of the cache lines 1210a–1210h corresponds to a cache address. Each one of the cache lines 1210a–1210h is associated with a VALID bit. According to the present embodiment, a VALID bit is asserted when texture data stored in an associated cache line (e.g., cache line 1210b) is ready to be retrieved by texture filter 605. The VALID bit, however, is de-asserted when texture data stored in the associated cache line is invalid or is not ready to be retrieved by texture filter 605. Mechanisms for asserting and unasserting the VALID bits are described in the following text. For simplicity, only eight cache lines 1210a–1210h are illustrated. However, it should be noted that cache memory 1200 may have different number of cache lines.

Figure 11:
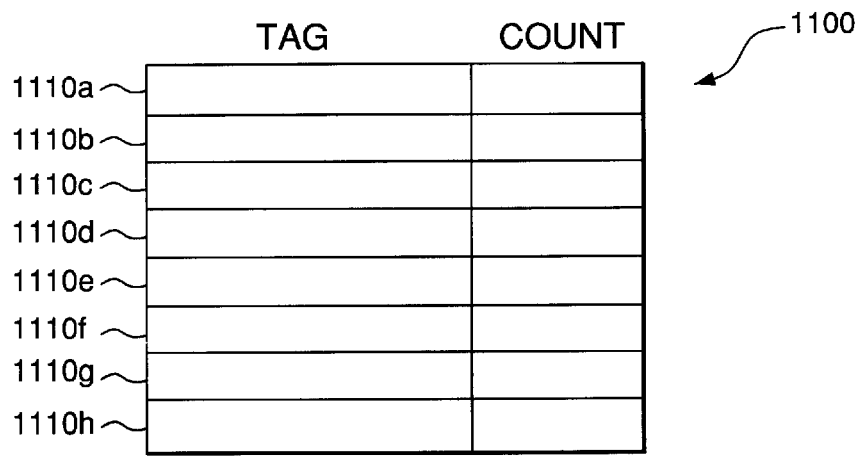
FIG. 11 is a diagram of a count-and-tag memory in accordance with an embodiment of the present invention.

FIG. 11 is a diagram of a count-and-tag memory 1100 residing within the texture request generator 603 in accordance with an embodiment of the present invention. Count-and-tag memory 1100 is configured for keeping track of the content of the texture response buffer 608 and the number of times the cache lines 1210a–1210h (FIG. 12) are accessed. As illustrated, count-and-tag memory 1100 includes a plurality of entries 1110a–1110h associated with cache lines 1210a–1210h of texture response buffer 608. Each of the entries 1110a–1110h stores a plurality of TAG bits for identifying the content of the associated cache line. For example, entry 1110c may include TAG bits for texture data A, indicating that cache line 1210c contains texture data A. According to the present embodiment, TAG bits associated with a cache line may be made up of MSBs of a pair of texture coordinates, or any other information that can be used to identify the content of the cache line. Each of the entries 1110a–1110h also stores a plurality of COUNT bits for indicating the number of times an associated cache line is accessed. For example, if cache line 1210d has been accessed 4 times, entry 1110d may store a the value 4 (or binary representation thereof) in the COUNT bits. The texture request generator 603 increments COUNT whenever a texture access for the same texture data is generated and decrements COUNT whenever texture data is retrieved by the texture filter 605. Mechanisms for incrementing and decrementing COUNT are described in greater detail below.

Figure 8:
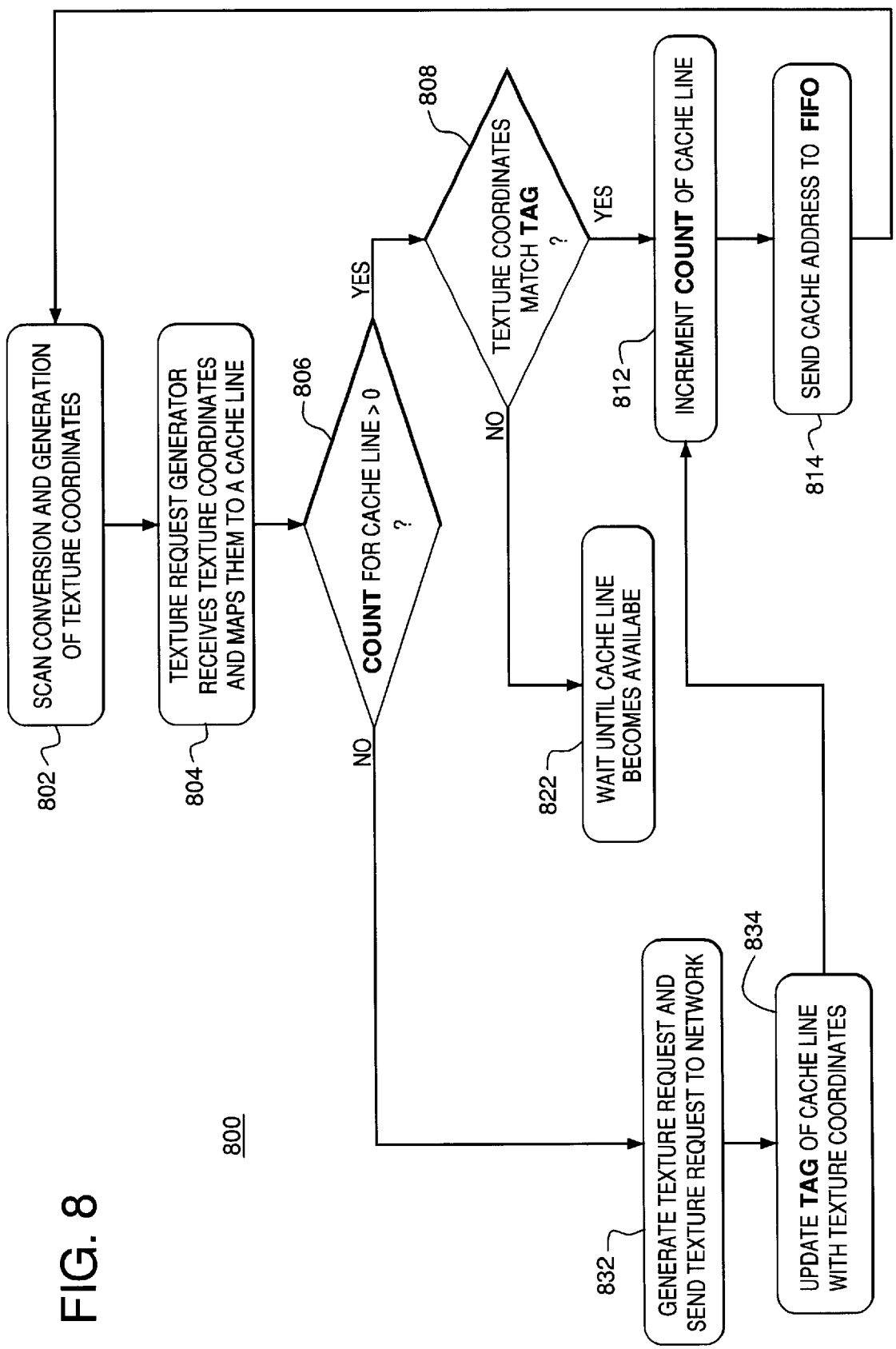
FIG. 8 is a flow chart diagram illustrating the steps of caching texture data carried out by the texture request generator in accordance with one embodiment of the present invention.

FIG. 8 is a flow chart diagram 800 illustrating the steps of caching texture data carried out by the texture request generator in accordance with one embodiment of the present invention. As illustrated, at step 802, scan converter 602 receives primitive packets from network 102, performs scan conversion, and generates one, two, or three texture coordinates for a pixel. According to the present embodiment, the one, two, or three texture coordinates point to texture data stored within the distributed memories (e.g., M chips M0–MF).

At step 804, the texture request generator 603 receives the texture coordinates and maps the texture coordinates to a particular cache address. In the present embodiment, each cache line of the texture response buffer 608 is associated with a predefined set of texture coordinates, and texture data corresponding to one pair texture coordinates of the set can be stored in the texture response buffer 608 at a time. This configuration is known as direct mapped cache configuration. However, it should be appreciated that other cache configurations, such as fully associative two-way set-associative, four-way set-associative, etc., may be implemented within texture response buffer 608 as well.

At step 806, the texture request generator 603 looks up the count-and-tag memory 1100 to determine the value of the COUNT bits corresponding to the cache line. Particularly, the texture request generator 603 determines whether the value of the COUNT bits corresponding to the specified cache line is zero. For example, if the texture coordinates are mapped to the address of cache line 1210c, the texture request generator 603 will look up entry 1110c (which corresponds to cache line 1210c) of count-and-tag memory 1100 to determine whether the COUNT bits of entry 1110c is zero.

If it is determined that the value of the COUNT bits of the specified cache line is zero, it can be understood that the cache line is available to receive the texture data from the network 102. Therefore, at step 832, a texture request for the texture data is generated and sent to the network 102.

At step 834, the texture request generator then updates the TAG bits corresponding to the cache line by storing TAG bits associated with the texture coordinates in an appropriate entry of the count-and-tag memory 1100. For example, the TAG bits corresponding to texture data A is stored within the entry 1110c if texture data A need be loaded into cache line 1210c. In the present embodiment, TAG bits are derived from the texture coordinates.

At step 812, the texture request generator 603 then increments the value of the COUNT bits. At step 814, the cache address is sent to the FIFO memory 604 to be queued for texture filtering.

Thereafter, the texture request generator 603 is ready to repeat process 800 beginning with step 802.

If it is determined, at step 806, that the value of the COUNT bits is not zero, it can be understood that the cache line may not be available for receiving new texture data. It can also be understood that the cache line already contains the required texture data. Thus, at step 808, the texture request generator 603 checks the count-and-tag memory 1100 and determines whether the TAG bits match the texture coordinates.

If it is determined that the TAG bits (within count-and-tag memory 1100) corresponding to the specified cache line match the texture coordinates, then it could be understood that the cache line already contains the required texture data. Accordingly, it is not necessary to request the same texture data again from the network. Thus, steps 812 and 814 are carried out to update the count-and-tag memory 1100. Thereafter, the texture request generator 603 is ready to repeat process 800 beginning with step 802 for another pair of texture coordinates.

However, if it is determined that the TAG bits corresponding to the specified cache line do not match the texture coordinates, the it could be understood that the cache line is occupied by other texture data. Because new texture data needs to be loaded, and because the cache line is already occupied, the rasterization process needs to be stalled. At step 822, the texture request generator 603 waits until the value of the COUNT bits corresponding to the specified cache line reaches to zero. Thereafter, steps 832, 834, 812 and 814 are carried out. Thereafter, texture request generator 603 will be ready to repeat process 800 beginning with step 802 for a new pair of texture coordinates.

In another embodiment of the present invention where a two-way associative cache is implemented in the texture response buffer 608, each pair of texture coordinates map into one of two locations in the cache. Thus, in order to determine the content of the cache, the COUNT and TAG values of both cache lines must be checked. The main differences between a two-way associative cache embodiment and a direct-mapped embodiment of the present invention are highlighted in the following.

In a two-way associative cache embodiment, two cache lines associated with the texture coordinates and are checked to determine whether their COUNT values are zero. In this case, a texture request is generated to access the distributed texture memory.

If the COUNT values of one or both of the cache lines are non-zero, and if both texture coordinates fail to match the TAGs, texture response buffer 608 needs to be stalled.

If the COUNT values of one or both of the cache lines are non-zero, and if one of the TAGs matches the texture coordinates, then there is a cache hit and a new texture request is not necessary.

However, if the TAGs do not match the texture coordinates but one of the COUNT values is zero, texture request is also generated to access the distributed texture memory.

Figure 9:
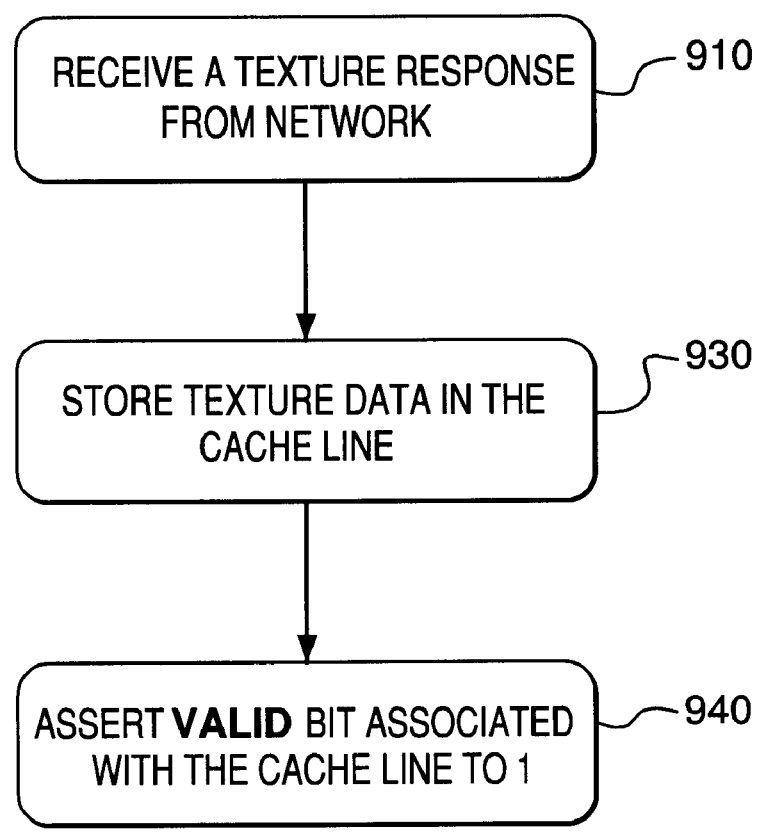
FIG. 9 is a flow chart diagram illustrating the operations of a texture response buffer when receiving a texture response in accordance with an embodiment of the present invention.

FIG. 9 is a flow chart diagram illustrating the operations of the texture response buffer 608 when receiving a texture response from the network 102 in furtherance of one embodiment of the present invention. As illustrated, at step 910, texture response buffer 608 receives a texture response from the network 102. In the present embodiment, the texture response includes texture data and the cache line at which the texture data is stored. Thereafter, at step 930, the texture response buffer 608 stores the texture data within an appropriate cache line. At step 940, the texture response buffer 608 also assert a VALID bit associated with the cache line.

Figure 10:
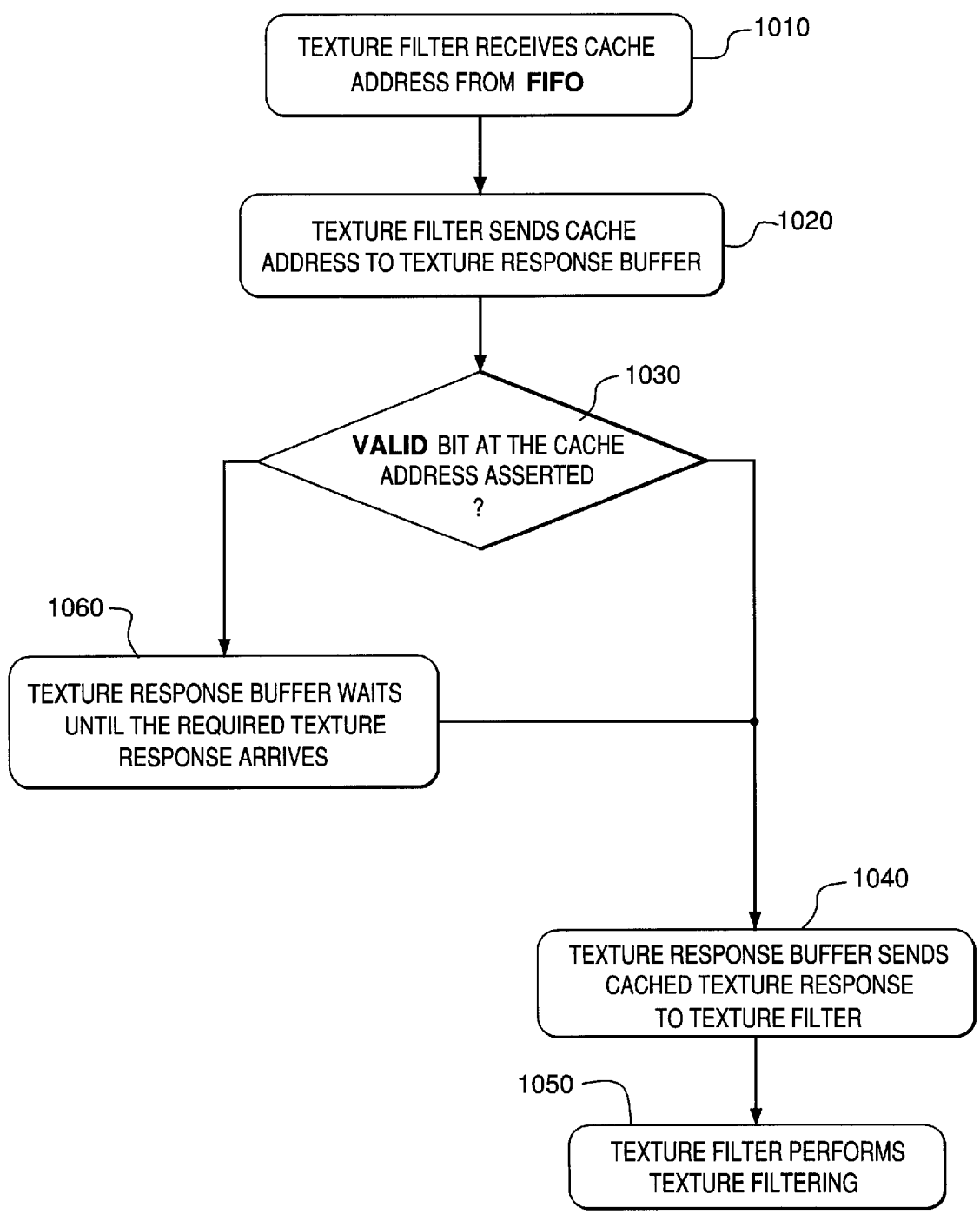
FIG. 10 is a flow chart diagram illustrating the steps of the retrieving cached texture data in accordance with an embodiment of the present invention.

FIG. 10 is a flow chart diagram illustrating the steps of the retrieving cached texture data carried out by the texture filter 605 and texture response buffer 608 in accordance with an embodiment of the present invention. As illustrated, at step 1010, the texture filter 605 receives a cache address from the FIFO memory 604. As discussed above with, the cache address is generated by the texture request generator 603 and stored within FIFO memory 604 prior to the texture filtering process such that transmission latency can be concealed.

At step 1020, the texture filter 605 sends the cache address to the texture response buffer 608. The texture response buffer 608 will then determine whether the specified cache line is valid by checking its VALID bit at step 1030.

At step 1040, if the VALID bit is asserted, the texture response buffer 608 then sends the texture data contained in the cache line to the texture filter 605. At step 1050, the texture filter 605 then performs texture filtering using the cached texture data.

At step 1060, if the VALID bit is not asserted, the texture response buffer 608 then waits until the required texture data arrives.

After the required texture data is sent to the texture filter, the texture response buffer 608 then sends the corresponding cache address to the texture request generator 603, which will decrement the COUNT associated with the cache address. If the COUNT memory reaches zero, the texture request generator then sends an INVALIDATE signal to the texture response buffer 608 to de-assert the VALID bit.

According to one embodiment of the present invention, texture request generator 603 further includes an address side combiner and a count side combiner. The address side and count side combiners are advantageous because physical memories cannot be updated in one clock and have the updated value read in the next clock. The combiners allow data to be read every clock by collecting data so that there is sufficient time between accesses to a given memory location and so that an out-of-date value is never read. Table 1 shows several examples illustrating the functionality of a combiner for a given memory location that can only be read once every 3 clocks.

TABLE 1

|  | Input to combiner | Output of Combiner | |
|---|---|---|---|
|  | Addr | Addr | COUNT |
| Example 1 | 1 |  |  |
|  | 2 |  |  |
|  | 3 |  |  |
|  | 1 | 1 | 1 |
|  | 2 | 2 | 1 |
|  | 3 | 3 | 1 |
|  |  | 1 | 1 |
|  |  | 2 | 1 |
|  |  | 3 | 1 |
| Example 2 | 1 |  |  |
|  | 1 |  |  |
|  | 1 |  |  |
|  | 2 | 1 | 3 |
|  | 3 | — | — |
|  |  | 2 | 1 |
|  |  | 3 | 1 |
| Example 3 | 1 |  |  |
|  | 2 |  |  |
|  | 1 |  |  |
|  | 3 | 1 | 2 |
|  | 1 | 2 | 1 |
|  |  | — | — |
|  |  | 3 | 1 |
|  |  | 1 | 1 |

As illustrated in Table 1, like addresses are combined to conform to the memory access rules. When addresses are combined, counts are maintained to denote that a given address of a memory location represents multiple initial addresses (before the combiner) so that the cache management mechanisms of the present invention can be performed properly.

In accordance with one embodiment of the present invention, the texture request generator 603 further includes an arbiter for choosing between data from the address stream and the count stream. An arbiter is advantageous because a memory system that can be accessed by two streams simultaneously is expensive to implement. In addition, it is necessary to adhere to the rules of memory access (e.g., read once every 3 clocks). The mechanisms that the arbiter uses is straightforward. First, the address stream is given priority. If there is address data to send and no count data in the last two clocks accesses the same memory location as the current address data, then the arbiter will send the address data. Secondly, if there is no address data or the address data conflicts with the count data, the arbiter sends the count data as long as it does not conflict with address data going to the memories. Thirdly, if both address and count data conflict, the arbiter do not send anything to the memory system for this clock.

Combiners and arbiters are well known in the art. Therefore, detailed discussion of their implementations within the present invention is not included herein to avoid obscuring aspects of the present invention.

The present invention, a cache memory for high latency and out-of-order return of texture data, has thus been disclosed. It should be appreciated that, while the present invention has been described in particular embodiments, the present invention should not be construed as limited by such embodiments, but rather construed according to the below claims.

What is claimed is:

1. A computer system with a distributed texture memory architecture comprising:

a host processor for issuing commands;
    a transmission network within said computer system that transmits packetized data over a plurality of paths;
    a geometry subsystem coupled to said transmission network that performs geometry calculations corresponding to three-dimensional graphics according to commands from said host processor;
    a rasterization subsystem coupled said transmission network that renders pixels based on geometry data generated by said geometry subsystem;
    a plurality of memory chips coupled to said rasterization unit that store distributed texture data of a single texture map;
    a texture cache subsystem coupled to said rasterization subsystem that caches said distributed texture data; and
    a display subsystem coupled to said network for displaying textured three dimensional graphics onto a display.

2. A computer system as recited in claim 1 wherein said rasterization subsystem minimizes latency in said transmission network by prefetching said distributed texture data and storing said distributed texture data within said texture cache subsystem.

3. A computer system as recited in claim 2 wherein said texture cache subsystem comprises a cache address queue that stores prefetched cache addresses according to a first ordering.

4. A computer system as recited in claim 3 wherein said cache address queue comprises a FIFO memory.

5. A computer system as recited in claim 3 wherein said rasterization subsystem performs texture filtering using prefetched texture data according to said first ordering.

6. A computer system as recited in claim 5 wherein said rasterization subsystem performs texture filtering independent of an order in which said distributed texture data enter said texture cache subsystem.

7. A computer system as recited in claim 6 wherein said texture cache subsystem comprises a count memory for keeping track of said difference.

8. A computer system as recited in claim 2 wherein said texture cache subsystem comprises a cache memory having a plurality of cache lines and wherein said cache memory subsystem determines whether a respective one of said cache lines is free by keeping track of a difference between a number of times said respective cache line is requested and a number of times said respective cache line is read.

9. A computer system as recited in claim 7 wherein said respective cache line is available to receive new texture data when said difference is zero and wherein said respective cache line is unavailable to receive new texture data when said difference is larger than zero.

10. A graphics subsystem for a computer system having a distributed text memory architecture, said graphics subsystem comprising:

a) a texture request generator that generates texture requests and maps said texture requests to a plurality of cache addresses, wherein said texture requests are sent to distributed texture memories of said computer system according to a first ordering;
    b) an address queue for receiving and storing said plurality of cache addresses according to said first ordering;
    c) a cache memory for receiving texture responses from said distributed texture memories, wherein said texture responses enter said cache memory according to a second ordering; and
    d) a texture filter for performing texture filtering by retrieving said texture responses from said cache memory in an order corresponding to said first ordering and independent of said second ordering.

11. A graphics subsystem as recited in claim 10 wherein said texture responses are prefetched and stored in said cache memory before texture filtering to minimize transmission latency.

12. A graphics subsystem as recited in claim 10 wherein said address queue provides said plurality of cache addresses to said texture filter according to said first ordering.

13. A graphics subsystem as recited in claim 12 wherein said address queue comprises a FIFO memory.

14. A graphics subsystem as recited in claim 10 further comprising a count memory for keeping track of a difference between a number of times a cache line of said cache memory is requested and a number of times said cache line is read.

15. A graphics subsystem as recited in claim 14 wherein said cache line is free to receive new texture response when said difference is zero and wherein said cache line is unavailable to receive new texture response when said difference is larger than zero.

16. In a computer system, a method of rendering pixels with texture data stored in distributed texture memories, said method comprising the steps of:
   a) receiving a plurality texture memory addresses, said plurality of texture memory addresses corresponding to a plurality of cache address of a texture cache memory;
   b) sending a plurality of texture requests to said distributed texture memories according to a first ordering;
   c) receiving texture responses from said distributed texture memories and storing said texture responses within said texture cache memory, wherein said texture responses enter said texture cache memory according to a second ordering; and
   d) retrieving said texture responses from said texture cache memory according to said first ordering and independent of said second ordering.

17. A method as recited in claim 16 wherein said step (b) and said step (d) are temporally separated to minimize data transmission latency.

18. A method as recited in claim 16 further comprising the steps of storing a plurality of cache addresses corresponding to said plurality of texture requests in an address queue according to said first ordering.

19. A method as recited in claim 18 wherein said address queue comprises a FIFO (first in first out) memory.

20. A method as recited in claim 16 further comprising a step of keeping track of a difference between a number of times a cache line of said texture cache memory is requested and a number of times said cache line is read.

21. A graphics subsystem as recited in claim 20 wherein said cache line is free to receive new texture data when said difference is zero and wherein said cache line is unavailable to receive new texture data when said difference is larger than zero.

* * * * *

UNITED STATES PATENT AND TRADEMARK OFFICE
CERTIFICATE OF CORRECTION

PATENT NO. : 6,426,753 B1
DATED : July 30, 2002
INVENTOR(S) : Migdal

It is certified that error appears in the above-identified patent and that said Letters Patent is hereby corrected as shown below:

Column 1,
Lines 5 through 11, please delete the "Related Cases" Section and the text appearing under this section.

Column 14,
Line 46, please delete the words "claim 7" and insert therefor -- claim 8 --.

Signed and Sealed this

Seventeenth Day of December, 2002

JAMES E. ROGAN
*Director of the United States Patent and Trademark Office*